United States Patent Office 3,155,178
Patented Nov. 3, 1964

3,155,178
AQUEOUS FOAMS AND FOAMING AGENTS
Willard H. Kirkpatrick, Sugar Land, and Virgil L. Seale and Richard E. Berkley, Houston, Tex., assignors to Nalco Chemical Company, a corporation of Delaware
No Drawing. Filed Dec. 5, 1960, Ser. No. 73,546
8 Claims. (Cl. 175—69)

This invention, in general, relates to improvements in foaming agents for aqueous systems and in the production of aqueous foams in subterranean formations. The invention has application to the production of aqueous foams in a well bore during the drilling thereof by gas or mist drilling operations. The invention also relates to the production of aqueous foams in gas wells, gas storage pools, and the like.

In the drilling of a bore into the earth with a rotary tool, it has been the almost universal practice up until recent years to circulate a liquid, such as water, oil, a water-in-oil emulsion, or an oil-in-water emulsion, usually with mud solids suspended therein, to the drilling zone during the drilling operation. One of the functions in circulating these liquids, usually in the form of a drilling mud, from the earth's surface to the drilling zone and thereafter returning the liquid to the surface is to remove from the bore the drilled solids. In recent years, some wells have been successfully drilled by a different technique in which a compressed gas, such as air, is pumped into the well and discharged in the well in the drilling zone. This compressed gas flows rapidly up the well bore around the drill string and carries with it the drilled solids. In many instances, the drilling operation is essentially a dry process inasmuch as there is essentially no liquid present in the well bore.

This invention is concerned with gas drilling where there is water present in the well bore, particulraly those instances where at least 1–2 barrels and up to 60–70 barrels of water per hour are introduced into the well bore. The water introduced into the well bore comes from two primary sources. One source is water which flows into the well bore due to formation seepage of water into the well bore. Such water invasion can occur, for example, while drilling through a water-bearing subterranean zone or even long after the drill has passed through and beyond the water-bearing subterranean zone.

This invention is also concerned with a drilling procedure referred to in the trade as "mist drilling." Mist drilling is a modification of dry gas drilling in which the driller introduces into the well bore a controlled quantity of water in addition to the gas medium for lifting out the drilled solids. Mist drilling differs from the aforedescribed fluid drilling in that in the latter instance the fluid completely fills the area between the drill string and the well bore from the drilling zone to the top of the well and forms a fluid head, while in the former instance the amount of water introduced, at most, formed a small pool in the drilling zone. The water is removed from the drilling zone in the mist drilling operation by causing it to take the form of a stable aqueous foam which has a density only a fraction of the density of the water. The compressed gas discharged in the drilling zone plus the rotation of the drilling tool gives sufficient agitation for the formation of the foam, which is thereafter carried up to the surface by the gas flowing upwardly in the well bore. The drilled solids are also carried up with the aqueous foam.

Some of the stated advantages of the gas drilling method over the more conventional mud drilling method, in those instances where the formations drilled are suitable for gas drilling operations, are increased penetration rate, longer bit life, quicker rate of return of analyzable samples to the surface, accurate location of water-bearing zones and measurement of flow, precise location of oil and gas bearing zones, especially those of low formation pressure, flow and pressure testing of productive zones without resort to drill stem tests, a lessening of possible contamination of prospective or known producing zones, and greater flexibility in physical and chemical alteration of the drilling fluid to meet a particular down hole condition or conditions. One difficulty in dry gas drilling where water seeps into the bore and accumulates in the drilling zone, and also in mist drilling operations, is that the moistened drilled solids tend to ball as the drill rotates. The balled solids become too heavy to be lifted out by the gas or the aqueous foam. This problem, however, has been for the most part overcome by the introduction into the bore of antiballing agents, such as calcium stearate, zinc stearate, silica gel and others, which coat the drilled particles with a waterproof coating. The solids ball only when they are water-wettable and, therefore, the waterproof coating prevents substantial agglomeration of the drilled solids.

An object of the invention is to provide improvements in nonionic foaming agents for foaming aqueous systems.

Another object of this invention is to provide improvements in aqueous foam systems for removing invasion water from subterranean drilling zones during the drilling of a well by the gas drilling method.

Another object of the invention is to provide improvements in aqueous foam systems for conveying during mist drilling operations both soid particles and water from the drilling zone to the surface.

Still another object of the invention is to provide improvements in gas drilling operations where water is present in the drilling zone.

Another aspect of the invention relates to the removal of invasion water from gas wells, gas storage pools and the like. A well or storage pool often accumulates over a period of time at the bottom thereof a pool of water which interferes with gas flow and causes the gas to be highly water laden. When such accumulation occurs, it is often desirable to remove the water. One procedure for doing this involves the installation of a pipe with a pump at the bottom for pumping the accumultaed water to the surface. A much simpler procedure, however, has been evolved by simply injecting into the well casing a foaming agent which causes the accumulate water to foam into a stable aqueous foam which can be carried to the well surface as the gas is released from the subterranean formation and brought to the well surface. This invention is also concerned with the production of stable aqueous foams in gas wells, gas storage pools and the like for removing accumulated water from gas producing or gas storage areas.

It is, accordingly, an object of this invention to provide improvements in aqueous foam systems used to remove water from subterranean gas producing zones, subterranean gas storage zones and the like.

Foaming agents for the production of aqueous foams in subterranean formations ideally should produce light, stable foams with fresh water which contain, at most, only minor quantities of water-soluble salts and also with saline waters which contain appreciable quantities of water-soluble salts, such as sodium chloride, calcium salts and/or magnesium salts. The surface-active foaming agents, therefore, should function well in hard waters as well as soft waters. The foaming agents used in this invention are nonionic surface-active agents.

The nonionic foaming agents of this invention are polyoxyethylated organic compounds having a hydrophobic organic nucleus and a hydrophilic polyoxyethylene chain. These nonionic surface-active agents are polyoxyethylated organic compounds in which the hydrophobic organic nucleus which is polyoxyethylated is a monohydroxy hydroxy hydrocarbon.

The nonionic foaming agents of this invention are prepared by polyoxyethylating a monohydric organic compound which has a long chain alkyl or alkenyl group which is hydrophobic or which has a monoalkyl aryl group or a dialkyl aryl group whichl is hydrophobic. The most preferred organic compounds are aliphatic monohydric alcohols having 12–24 carbon atoms or mono- or dialkyl phenols in which each alkyl group contains 6–12 carbon atoms.

These organic compounds are polyoxyethylated by conventional procedures in the presence of a basic compound, usually sodium hydroxide or potassium hydroxide. The degree of polyoxyethylation falls within the range of about an average of more than 20 and up to about 75 mols of oxyethylene groups per mol of the polyoxyethylated organic compounds.

These polyoxyethylated compounds are solid products which can be added to the well bore in the solid state or they can be blended with water or a water-alcohol mixture to give a liquid product which is easily metered into the well. The solid polyoxyethylated compounds can be molded into suitable shapes such as sticks, balls, and the like and weighted, if desired, by solid particles of heavy density dispersed in the molded solid products. Suitable solids for weighting purposes are barium salts such as barium sulfate, ferric oxide, lead oxide and the like. The solid products dissolve slowly in the water at the well bottom and are especially useful in the solid state for the removal of water from gas wells.

The following examples are provided to illustrate some preferred embodiments of the invention. They also show the foaming activity of these compounds in both fresh water and saline water.

The evaluation of the foaming activity of the compounds was conducted according to the following procedure. One liter of water was placed in a cylindrical Lucite column 6 feet high with an inside diameter of 3½ inches. Air was introduced through the top of the column by means of a ½ inch pipe extending to within ½ inch of the bottom of the column. The air flow rate was set at 1.1 cubic feet per minute. The concentration of the foaming agent in the water was 0.1 weight percent. The fresh water used was ordinary tap water and the saline water was a brine formed by dissolving 1200 grams of sodium chloride, 88.8 grams of calcium chloride and 66.8 grams of magnesium chloride in 16 liters of tap water. The test was run over a period of 14 minutes, and the weight of water in grams removed during that period of time in the form of a foam bubbling over the top of the column was determined by direct weighing.

The following examples are presented in tabulated form. These examples identify the polyoxyethylated compound, its formulation in a water-methanol solvent mixture and its foaming activity in fresh and saline waters. The numbers in parentheses after the compounds in the second column indicate the average mols of ethylene oxide per mol of the polyoxyethylated compound.

EXAMPLES 1–9

*Polyoxyethylated Higher Aliphatic Alcohols*

| Ex. | Polyoxyethylated Compounds | | Gm. Water | Gm. CH₃OH | Gm. Water Removed as Foam | |
|---|---|---|---|---|---|---|
| | Compounds | Gm. | | | Fresh | Saline |
| 1 | Tridecyl alcohol (20.5) | 200 | 125 | 44 | 410 | 375 |
| 2 | Tridecyl alcohol (27) | 200 | 120 | 44 | 445 | 395 |
| 3 | Tridecyl alcohol (34.5) | 200 | 116 | 43 | 435 | 390 |
| 4 | Cetyl alcohol-stearyl alcohol mixture (21.5) | 200 | 120 | 119 | 325 | 290 |
| 5 | Cetyl alcohol-stearyl alcohol mixture (26.1) | 200 | 112 | 112 | 335 | 300 |
| 6 | Cetyl alcohol-stearyl alcohol mixture (31.5) | 200 | 107 | 106 | 340 | 260 |
| 7 | Cetyl alcohol-stearyl alcohol mixture (39.5) | 200 | 100 | 100 | 310 | 270 |
| 8 | Hexadecyl alcohol (20) | 200 | 66 | 66 | 375 | 350 |
| 9 | Hexadecyl alcohol (25) | 200 | 64 | 64 | 405 | 395 |

Polyoxyethylated tridecyl alcohol ranging from about an average of 20–50 mols of oxyethylene groups per mol of the polyoxyethylated alcohol have shown to be the most active foaming agents of the polyoxyethylated aliphatic, monohydric alcohols. These compounds, therefore, constitute the most preferred class of compounds among the polyoxyethylated higher aliphatic, monohydric alcohols as the foaming agents for aqueous systems with which the invention is concerned. Other polyoxyethylated aliphatic alcohols include polyoxyethylated alcohols such as lauryl alcohol, oleyl alcohol, cetyl alcohol, stearyl alcohol, and similar fatty alcohols with 12–24 carbons.

Among the polyoxyethylated alkyl phenols, the polyoxyalkylated dialkyl phenols have shown in general better performance in foaming than the polyoxyalkylated monoalkyl phenols. The following examples provide a comparison of foaming activity between these foaming agents.

EXAMPLES 10–27

*Polyoxyethylated Alkyl Phenols*

| Ex. | Polyoxyethylated Compounds | | Gm. Water | Gm. CH₃OH | Gm. Water Removed as Foam | |
|---|---|---|---|---|---|---|
| | Compounds | Gm. | | | Fresh | Saline |
| 10 | o,p-Dinonyl phenol (27.4) | 200 | 63 | 62 | 520 | 460 |
| 11 | o,p-Dinonyl phenol (35.8) | 200 | 66 | 65 | 515 | 445 |
| 12 | o,p-Dinonyl phenol (44.3) | 200 | 68 | 67 | 525 | 410 |
| 13 | o,p-Dinonyl phenol (50.2) | 200 | 68 | 68 | 520 | 410 |
| 14 | o,p-Dinonyl phenol (60.6) | 200 | 70 | 70 | 505 | 445 |
| 15 | p-Nonyl phenol (22.4) | 200 | 109 | 42 | 430 | 390 |
| 16 | p-Nonyl phenol (27) | 200 | 108 | 42 | 430 | 395 |
| 17 | p-Nonyl phenol (31.2) | 200 | 107 | 42 | 440 | 395 |
| 18 | p-Nonyl phenol (35.2) | 200 | 105 | 42 | 440 | 400 |
| 19 | p-Octyl phenol (22.3) | 200 | 122 | 44 | 415 | 430 |
| 20 | p-Octyl phenol (27.5) | 200 | 119 | 43 | 440 | 430 |
| 21 | p-Octyl phenol (31.4) | 200 | 115 | 43 | 450 | 425 |
| 22 | p-Octyl phenol (36.5) | 200 | 112 | 43 | 460 | 420 |
| 23 | p-Dodecyl phenol (21.6) | 200 | 109 | 42 | 420 | 415 |
| 24 | p-Dodecyl phenol (27.4) | 200 | 109 | 42 | 410 | 395 |
| 25 | p-Dodecyl phenol (33.8) | 200 | 107 | 42 | 415 | 380 |
| 26 | p-Dodecyl phenol (39.4) | 200 | 106 | 42 | 420 | 375 |
| 27 | p-Dodecyl phenol (44.4) | 200 | 105 | 42 | 430 | 375 |

The alkyl phenols useful herein are ones such as hexyl phenol, octyl phenol, nonyl phenol, dodecyl phenol, dihexyl phenol, dioctyl phenol, dinonyl phenol, didodecyl phenol. We especially prefer the alkyl phenols in which one alkyl group is in the para-position with respect to the hydroxy groups of the phenol.

Examples of weighted sticks of foaming agents are 50 to 90% polyoxyethylated tridecyl alcohol in which the oxyethylene groups average about 27 per mol and 50 to 10% of barium sulfate (Baryta White). Similar weighted sticks can be made at the aforesaid percentages from other solid polyoxyethylated compounds of the invention and barium sulfate, ferric oxide, lead oxide or the like. These sticks are especially useful for rejuvenating water-logged natural gas wells by the previously described technique in which the solid sticks are dropped into the well and natural gas is flowed through the accumulated water at the well bottom.

The polyoxyethylated foaming agents of the invention are added to the aqueous system to be foamed in a foam-producing quantity to give a concentration in the aqueous system in the range of about 0.01–1% by weight, based on the weight of the water in the aqueous system, of the polyoxyethylated compound. The concentration may be greater than 1%, but there is little, if any, value in dosages exceeding 1% concentration.

Thus, it will be seen from the foregoing disclosure that this invention provides improvements in the production of foams utilizable in removing water from subterranean areas. The foaming agents of this invention, novel embodiments of which are herein claimed, produce good volumes of foam in both soft and hard waters, a requirement essential for a foaming agent of universal application in the production of foams in well drilling and water removing operations.

The invention is hereby claimed as follows:

1. A process for raising water from a subterranean zone to the surface which comprises mixing with said water a foam producing quantity of a polyoxyethylated monohydric, aliphatic alcohol having 12–24 carbons and an average of more than 20 oxyethylene groups per mol, and flowing a gas through said subterranean zone and then to the surface to cause said water to form an aqueous foam and raise said foam to the surface with said gas.

2. A process for raising water from a subterranean zone to the surface which comprises mixing with said water a foam producing quantity of a polyoxyethylated monohydric, aliphatic alcohol having 12–24 carbons and an average of more than 20 oxyethylene groups per mol, and flowing a gas selected from the group consisting of air and natural gas through said subterranean zone and then to the surface to cause said water to form an aqueous foam and raise said foam to the surface with said gas.

3. In a gas drilling process where saline subsurface water has invaded the drilling zone in the well bore, the steps of removing drilled solids and water from the drilling zone which comprise adding to the drilling zone a foam producing quantity of a polyoxyethylated monohydric, aliphatic alcohol having 12–24 carbons and an average of more than 20 oxyethylene groups per mol, and passing compressed gas at high velocity into the drilling zone and thereby creating an aqueous foam of said saline, subsurface water, and returning the gas with the foam and entrained solids to the surface through the well bore.

4. A mist drilling process comprising drilling a well bore with a rotary drilling tool, supplying to the drilling zone a small amount of water and a foam producing quantity of a polyoxyethylated monohydric, aliphatic alcohol having 12–24 carbons and an average of more than 20 oxyethylene groups per mol, and also supplying a gas at high velocity to the drilling zone and thereby creating an aqueous foam, and returning the gas with the foam and entrained solids to the surface through the well bore.

5. A process as claimed in claim 1 wherein said water which is formed into an aqueous foam is a saline water.

6. A process as claimed in claim 4 wherein said water which is formed into an aqueous foam is a saline water.

7. A process for raising water from a subterranean zone in a well bore to the surface which comprises dropping into said water through the well bore a solid, weighted molding of a water-soluble polyoxyethylated monohydric, aliphatic alcohol having 12–24 carbons, said polyoxyethylated alcohol having an average of more than 20 oxyethylene groups per mol, said molding having dispersed therein particles of a heavy density, weighting solid, allowing said polyoxyethylated alcohol to dissolve in said water, flowing a gas through said water, which has said polyoxyethylated alcohol dissolved therein, and then to the surface through said well bore to cause said water to form an aqueous foam and raise said foam to the surface with said gas.

8. A process as claimed in claim 7 wherein said molding is a molded stick of tridecyl alcohol polyoxyethylated with an average of about 27 mols of oxyethylene groups per mol with said particles dispersed therein.

References Cited in the file of this patent

UNITED STATES PATENTS

| | | |
|---|---|---|
| 2,168,116 | Crites et al. | Aug. 1, 1939 |
| 2,748,171 | Finch | May 29, 1956 |
| 2,748,867 | Lissant | June 5, 1956 |
| 2,841,621 | Riley | July 1, 1958 |
| 3,073,387 | Dunning | Jan. 15, 1963 |
| 3,076,508 | Lissant | Feb. 5, 1963 |
| 3,111,178 | Marsh | Nov. 19, 1963 |

FOREIGN PATENTS

| | | |
|---|---|---|
| 378,318 | Great Britain | Aug. 11, 1932 |

OTHER REFERENCES

Murray et al.: "Water Still Poses Tough Problem in Drilling With Air," The Oil and Gas Journal, June 10, 1957, pp. 105, 107, 110, 111, 112.

Schwartz: Surface Active Agents and Detergents, Vol. II, 1958, pages 120–123.

Randall et al.: "Stearates, Foaming Agents Combat Water in Air or Gas Drilling," The Oil and Gas Journal, Nov. 3, 1958. pp. 78–83.

Dunning et al.: "Foaming Agents are Low-Cost Treatment for Tired Gassers," Oil and Gas Jour., Vol. 57, No. 6, February 1959, pp. 108–110.

Dunning et al.: "Foaming Agents: Cure for Water-Logged Gas Wells." Petrol. Eng., Vol. 31, No. 12, November 1959, pp. B28–33.

UNITED STATES PATENT OFFICE
CERTIFICATE OF CORRECTION

Patent No. 3,155,178                                November 3, 1964

Willard H. Kirkpatrick et al.

It is hereby certified that error appears in the above numbered patent requiring correction and that the said Letters Patent should read as corrected below.

Column 2, line 27, for "soid" read -- solid --; line 43, for "accumulate" read -- accumulated --; same column 2, lines 70 and 71, for "monohydroxy hydroxy hydrocarbon" read -- monohydroxy hydrocarbon --; column 3, line 4, for "which1" read -- which --.

Signed and sealed this 6th day of July 1965.

(SEAL)
Attest:

ERNEST W. SWIDER                                  EDWARD J. BRENNER
Attesting Officer                                      Commissioner of Patents